(12) United States Patent
Kretzschmar et al.

(10) Patent No.: US 11,358,100 B2
(45) Date of Patent: Jun. 14, 2022

(54) ARRANGEMENT FOR PROVIDING STERILE WATER FOR INJECTION PURPOSES

(71) Applicant: Pharmatec GmbH, Dresden (DE)

(72) Inventors: Ralf Kretzschmar, Dresden (DE);
Daniel Daemmig, Coswig (DE);
Michael von Papen, Dresden (DE);
Stephan Simon, Dresden (DE)

(73) Assignee: Pharmatec GmbH, Dresden (DE)

( * ) Notice: Subject to any disclaimer, the term of this patent is extended or adjusted under 35 U.S.C. 154(b) by 462 days.

(21) Appl. No.: 15/580,003

(22) PCT Filed: May 20, 2016

(86) PCT No.: PCT/EP2016/061396
§ 371 (c)(1),
(2) Date: Dec. 6, 2017

(87) PCT Pub. No.: WO2016/198251
PCT Pub. Date: Dec. 15, 2016

(65) Prior Publication Data
US 2018/0133653 A1 May 17, 2018

(30) Foreign Application Priority Data

Jun. 8, 2015 (DE) .................. 10 2015 210 419.2
May 19, 2016 (DE) .................. 10 2016 208 571.9

(51) Int. Cl.
*B01D 61/36* (2006.01)
*B01D 63/08* (2006.01)
(Continued)

(52) U.S. Cl.
CPC ......... *B01D 61/366* (2013.01); *B01D 61/364* (2013.01); *B01D 63/082* (2013.01);
(Continued)

(58) Field of Classification Search
CPC .. C02F 1/045; C02F 1/447; C02F 1/14; C02F 1/16; C02F 1/44; C02F 2103/026;
(Continued)

(56) References Cited

U.S. PATENT DOCUMENTS 4,610,790 A * 9/1986 Reti .................. A61L 2/022
210/259
4,953,694 A * 9/1990 Hayashi ................ B01D 1/30
159/2.1

FOREIGN PATENT DOCUMENTS

CN 101325992 A 12/2008
CN 102438733 A 5/2012
(Continued)

OTHER PUBLICATIONS

EP 0094543 English description, Nov. 1983, Azko GmbH.*
(Continued)

*Primary Examiner* — Akash K Varma
(74) *Attorney, Agent, or Firm* — Michael Best & Friedrich LLP (57) ABSTRACT

An arrangement for providing sterile water for injection purposes is described. A device for heating drinking water above the boiling point, a device for maintaining a chamber inner pressure which lies below the atmospheric pressure, and an electronic controller are provided, and the chamber is equipped with at least one membrane which is impermeable for liquids and a film or plate at a distance from the membrane, wherein steam which is permeated through the membrane is condensed on the film of plate. The membrane and the film or plate form a module, and the condensed water can be removed from the chamber via an outlet as sterile water for injection purposes.

18 Claims, 4 Drawing Sheets

(51) Int. Cl.
*C02F 1/44* (2006.01)
*C02F 1/04* (2006.01)
*C02F 1/16* (2006.01)
*C02F 1/14* (2006.01)
*C02F 103/02* (2006.01)
*C02F 103/04* (2006.01)

(52) U.S. Cl.
CPC .............. *C02F 1/045* (2013.01); *C02F 1/447* (2013.01); *B01D 2311/10* (2013.01); *B01D 2311/14* (2013.01); *B01D 2311/243* (2013.01); *B01D 2311/25* (2013.01); *B01D 2311/2649* (2013.01); *B01D 2311/2692* (2013.01); *B01D 2313/22* (2013.01); *B01D 2313/243* (2013.01); *C02F 1/14* (2013.01); *C02F 1/16* (2013.01); *C02F 2103/026* (2013.01); *C02F 2103/04* (2013.01); *C02F 2209/02* (2013.01); *C02F 2209/05* (2013.01); *C02F 2301/063* (2013.01); *C02F 2303/04* (2013.01); *Y02W 10/37* (2015.05)

(58) Field of Classification Search
CPC .............. C02F 2103/04; C02F 2209/02; C02F 2209/05; C02F 2301/063; C02F 2303/04; B01D 61/366; B01D 61/364; B01D 61/36; B01D 63/082; B01D 63/08; B01D 2311/10; B01D 2311/14; B01D 2311/243; B01D 2311/25; B01D 2311/2649; B01D 2311/2692; B01D 2313/22; B01D 2313/243

USPC .......................................................... 210/85
See application file for complete search history.

(56) References Cited

FOREIGN PATENT DOCUMENTS

| | | | | |
|---|---|---|---|---|
| CN | 102861512 A | | 1/2013 | |
| DE | 102004030529 | | 1/2006 | |
| DE | 102009020128 | | 11/2010 | |
| EP | 0094543 | * | 11/1983 | ............ B01D 13/00 |
| JP | S58216704 A | | 12/1983 | |
| JP | S62180790 A | | 8/1987 | |
| JP | S63500576 A | | 3/1988 | |
| JP | H01176404 A | | 7/1989 | |
| JP | H01176406 A | | 7/1989 | |
| JP | H0313896 A | | 1/1991 | |
| JP | H03169386 A | | 7/1991 | |
| JP | 2011036831 A | | 2/2011 | |
| WO | 2014058309 | | 4/2014 | |

OTHER PUBLICATIONS

International Search Report for Application No. PCT/EP2016/061396 dated Jul. 15, 2016 (English Translation, 3 pages).

Chinese Patent Office Action and Search Report for Application No. 201680033674 9 dated Jul. 29, 2020 (11 pages including statement of relevance).

* cited by examiner

ARRANGEMENT FOR PROVIDING STERILE WATER FOR INJECTION PURPOSES

BACKGROUND OF THE INVENTION

The invention relates to an arrangement for providing sterile water for injection purposes. In this connection, sterile water can be obtained from drinking water and used in the field of medicine.

Up until now it is typical, to heat purified water to a temperature above the boiling point during the production of water for injection purposes (WFI) and to condense the water vapor obtained in this way while reducing the temperature. The condensation can be used for injection purposes. In order to insure the required sterility of the product, large amounts of energy have to be used during the production of industrial amounts of WFI with the method described in the prior art to date.

A method and device for the distillation of solutions is already known from the German patent application DE 102004030529 A1. A liquid flow flows through a condenser unit consisting of steam- and waterproof hollow filaments. While flowing through a heat exchanger, the liquid flow is subsequently heated to an upper processing temperature and subsequently enters into an evaporator unit consisting of microporous and hydrophobic hollow filaments. A vacuum in the vapor space is produced using a vacuum pump, which at least partially approaches and partially undershoots the boiling point of the liquid flow. The distillate that forms is pumped away. The apparatus is used particularly to generate fresh water from sea water or brackish water. A similar system having modular construction is known from the EPO patent application EP 2427263.

SUMMARY OF THE INVENTION

It is the aim of the invention to be able to produce sterile water for injection purposes with a reduced energy consumption on an industrial scale.

The arrangement according to the invention is characterized by a reduced energy consumption. Due to a boiling point that is reduced by the prevailing vacuum, it is possible, for example, to use the waste heat of other machines for the operation of the system.

The invention builds on the principle known per se of membrane distillation. The arrangement according to the invention is designed such that a device for maintaining an inner pressure which lies below the atmospheric pressure in a chamber for undershooting the boiling vapor pressure of drinking water at a certain temperature, a device for heating the drinking water to above the reduced boiling point within the chamber and an electronic controller are provided. The device for heating drinking water can preferably be operated electrically; however, also with another energy carrier. Even solar energy can be completely used or used as a solar energy support. During heating, a temperature of the drinking water of at least 50° C. should be achieved during normal operation.

The device for heating the drinking water is operated such that the drinking water is heated up to above the reduced boiling point within the chamber. The device for maintaining an inner pressure in the chamber accordingly sets a suitable pressure, which is particularly suitable for undershooting the boiling vapor pressure of drinking water at a certain temperature.

A device for maintaining a pressure below the atmospheric pressure can be a vacuum pump, with which the pressure in the chamber can be lowered below the atmospheric pressure prevailing in the surrounding environment. The inner pressure in the chamber should be reduced to a pressure in the range between 450 mbara and 500 mbara. A correspondingly reduced boiling point of water results from this reduced inner pressure. Thus, steam could be present already at temperatures around or below 80° C.

Starting at one side, a pressure gradient can be maintained within the chamber, so that a reduction in the inner pressure is maintained starting from the side at which drinking water is supplied in the direction of the side arranged opposite thereto. As a result, not only a flow of the drinking water can be achieved in this direction but also the boiling point decreasing in this direction on account of the gradually reduced inner pressure can be advantageously utilized. The drinking water that is fed in is heated by means of heating steam, which is provided with the system in a steam generator, via the exchange of condensation heat. This takes place at a negative pressure of approximately 500 mbara.

At least one membrane permeable for liquid is arranged in the chamber and a film or plate is arranged at a distance from the membrane within the chamber. Steam, which is permeated through the membrane, condenses on the plate or film. In so doing, particles, germs, liquid water and non-gaseous constituents are separated from the vaporous water by the membrane. The heated water flows in a so-called feed slot between a membrane and a film. Steam condenses on the film and transfers the released condensation heat to the water on the other side of the film. As a result, a portion of the water is evaporated on the membrane due to the pressure gradient and then enters into the steam channel. Here it is guided onto the films of the next effect (arrangement of membrane and film) and condensed here to WFI while discharging the condensation heat to the feed water on the other side of the film. A high degree of efficiency results from this repetitive design.

In a first effect, the so-called steam generator, heated heating water, preferably softened water, is introduced from the outside into the chamber consisting of empty frames and membranes, to which a pressure lower than the boiling vapor pressure of the heating water is applied. Heating water evaporated on the boundary surface to the membranes is guided via an applied pressure gradient to the steam side of the films of the first effect. The cold feed/drinking water is guided on the other side of said film. Condensation heat is transferred to the feed water by means of the condensation of the steam at the film, until said feed water achieves the boiling point reduced by the applied negative pressure and partially evaporates through the membrane opposite to the film. The condensate of the heating steam is completely supplied to the heating circuit.

A membrane and a film or plate or respectively condensation surface form a so-called effect. Each membrane, film and/or a so-called spacer sit in a frame. A functional grouping of a plurality of membrane frames, spacer (plate) and film frames is known as an effect. The functional grouping of a plurality of effects (steam generator and/or condenser included) results in a module. Only membranes and spacers are, for example, located in a steam generator. Only films and spacers are located in a condenser. A film or plate can be cooled, whereby the condensation is supported. To this end, colder water can be supplied to the surface of a film or plate that faces away from the membrane of an effect or by canals formed therein. This water can relate at least partially to drinking water that is thereby heated to a temperature above the boiling point that is reduced on the steam side and is supplied to at least one membrane on the surface facing away from the respective film or plate. As a result, the boiling vapor pressure of the feed water undershot on the boundary surface of feed water and membrane and a steam passage through the hydrophobic membrane is achieved, which separates the liquid and the gaseous phase from one another. Condensed water is discarded immediately behind the membrane via a drainage. The pure steam obtained is guided via steam channels to an arrangement of films/plates, where the condensation of the pure steam to WFI occurs. The condensation heat released in the process is used to heat the feed water flowing on the other side of the film up to the reduced boiling point. The movement of the pure steam results by means of a vacuum gradient in the direction of the increasing effect number which is maintained by a vacuum generation. In order to ensure a complete pure steam deposition, the pure steam, before leaving the system, is guided onto an arrangement of water-cooled films, the condenser, where pure steam that is still contained is almost completely condensed to WFI.

The condensed water is removed from the chamber via a drain as sterile water for injection purposes WFI. Said condensed water can be transferred to an external collection tank and from here fed to a further transport or to a portioning in partial volumes suitable for an application. The recovered WFI can be supplied via a line mounted to the WFI container for the purpose of hot storage to a heat circuit, whereby a controllable heating is achieved via the electronic controller. A further line enables a return of hot WFI into the module in order to ensure a heating/hot water sanitization of the system to/at a temperature of at least 85° C.

In addition, an electronic controller is provided, with which at least the temperature of the drinking water, which is heated above the boiling point reduced in the chamber, can be influenced. According to the invention, the electronic controller is designed in such a way that a heating of the entire arrangement in the interior of the chamber to a temperature of at least 85° C. can be achieved prior to each start-up or in predeterminable time intervals. This makes it possible for absolute asepsis and sterility of the water for injection purposes that is provided with the arrangement to be maintained.

Suitable hydrophobic materials which are suitable for use as the membrane are generally known from the prior art.

A plurality of effects can advantageously be provided in a series arrangement in the chamber. These can preferably be provided as a plurality of series arrangements of effects that are successively arranged. As a result, the space requirement of the arrangement can be reduced at an elevated capacity. A chamber is formed by means of seal welded modules. For example, this relates to rectangular blocks, which are penetrated by channels in which a vacuum exists and all process steps take place.

Each frame consists of a functional element (film/membrane) and a plurality of partial volumes, which guide the pure steam onto the films and the feed water onto the membranes, discharge the WFI and constituents that condensed too early (drainage), collect the WFI and remove inert gases and thus ensure the tight sealing of the effects with one another via vacuum that is applied. These partial volumes should be separated from one another so that a mixing of the different media is prevented. Drinking water, which is condensed directly on a membrane and not on a film, can be discarded via a drainage line.

A return line can in each case be connected to the outlet/outlets for WFI, via which WFI can be heated via a heating element to at least 85° C. and returned to the modules during time periods, within which a temperature that is elevated to at least 85° C. is maintained in the chamber. Recirculated WFI, which possibly no longer fulfills the standards for injection purposes, can be discarded into the waste water via a valve that can be influenced by the electronic controller, for example a two-way valve.

After successfully heating the interior of the chamber to a temperature of at least 85° C., which should be carried out over a time period of at least 60 min, the electronic controller can again introduce a normal operation at a somewhat reduced temperature, at which the return line(s) is/are again closed in the event that said lines are provided.

A sensor for determining the mass or the volumetric flow can be arranged at and/or in an outlet of a module.

When a sensor detects that a predeterminable threshold value has been undershot or exceeded, an acoustic and/or optical signal can be generated to indicate a defect. There is, however, also the option, to solely or additionally supply a warning signal to the electronic controller. As a result, an immediate, complete shutdown can then take place in particularly critical cases.

In order to further increase the operational reliability, sterile water for injection purposes contained in a drain, a collection line or an internal collection tank, in which a pressure is maintained below the atmospheric pressure, can be conveyed by means of a pump through a filter element into a further external collection tank for sterile water for injection purposes, in which atmospheric pressure is maintained. If need be, particles contained in the water can be separated from the same, which can be particularly advantageous in critical operating states, such as, e.g., after a first start-up or restart-up of the arrangement.

In the case of the arrangement according to the invention, a plurality of effects can be connected in parallel with one another during the supply of drinking water and/or during the removal of sterile water for injection purposes. The plurality of effects can relate to all of the effects or also to several groups of effects.

Drinking water can thus be supplied to all of the modules or to the modules of a group via a common collection line. In the case of the removal of sterile water suitable for injection purposes, a plurality of outlets from modules for this water can lead into a common collection line.

There is also the option to form the arrangement such that particularly the function of the membrane can be monitored. Damage to one or also a plurality of membranes can lead to the contamination of the sterile water. In order to prevent contaminated water being used as WFI, WFI which is permeated through membranes can be fed to at least one testing unit, in which at least one measured variable is checked with which an assertion about the contamination of the product with feed water can be made and therefore about the integrity of the films. In the case of an undesirable perforation in a membrane, liquid feed water can enter the product side, where it mixes with the drainage water that, of course, accumulates directly behind the membrane. A further testing unit in the drainage line behind each module allows for a sensitive determination of the contamination of the drainage water with feed water that has passed unvaporized through the membrane. In the testing units, the electric conductivity or the specific electric resistance can preferably be checked. Because the electric conductivity (the electric resistance) of WFI contaminated with drinking water is higher (lower) than that of pure WFI, an acoustic and/or optical signal can be generated in the event that a threshold value is exceeded or undershot, and the entire contaminated WFI can be discarded into the waste water in a controllable manner by means of the electronic controller. Hence, a contamination of the WFI collection tank and the WFI contained therein can be prevented. This test can be carried out continuously or also successively by random sampling after predeterminable time intervals have elapsed. A plurality of testing devices can be connected to outlets for sterile water, whereby a concrete assertion can be obtained, in which effect or region of the arrangement a defect is present.

If a defect is recognized, the arrangement can be shut down. With such a design of the arrangement, defects or other problems at individual effects can be detected, so that a targeted servicing or repair of individual modules is possible and a complete examination of the entire arrangement is not required.

BRIEF DESCRIPTION OF THE DRAWINGS

The invention is explained in greater detail below using exemplary embodiments.

In the drawings.

DETAILED DESCRIPTION

Figure 1:
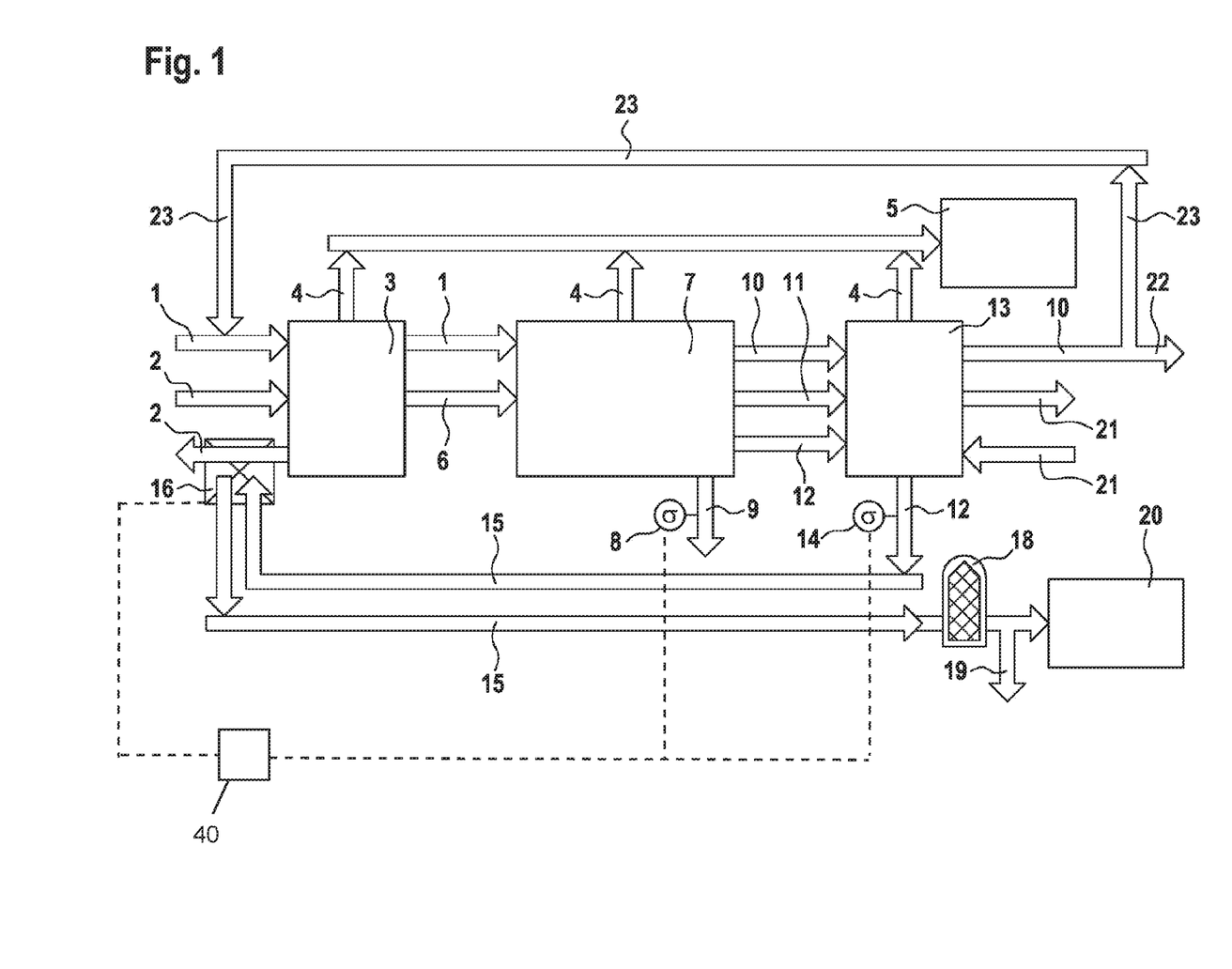
FIG. 1 shows a block diagram of an example of an arrangement according to the invention during normal operation.

A block diagram of an exemplary embodiment of an arrangement according to the invention during normal operation is shown in FIG. 1. Drinking water as feed water enters into a steam generator 3 for providing heating steam via a feed water line 1. The steam generator 3 generates under vacuum heating steam, which heats the cold feed water in a first effect 34. A heating circuit 2 is furthermore provided, by means of which the steam generator 3 is supplied with a heating medium. The heating medium is heated by a heating element 16. Feed water travels out of the steam generator 3 via the feed water line 1 and heating steam via a heating steam line 6 to a device 7 for membrane distillation. Concentrate travels out of the device 7 for membrane distillation via a concentrate line 10, pure steam via a pure steam line 11 as well as distillate via a distillate line 12 to a condenser 13. In addition, drainage is discharged via a drainage line 9. A measuring probe, respectively a sensor, is provided in the drainage line 9 for determining the electric conductivity and/or the specific electric resistance of the drainage. The condenser 13 is connected to a cooling circuit 21. Distillate travels out of the condenser 13 via a distillate line 12 into a distillate return line 15 to the heating circuit 16, for example a heat exchanger through which a heating medium passes. The potentially heated distillate is again fed back to a filter 18 and finally enters as WFI into a storage tank 20 for the distillate. A discard line 19 for the distillate branches off downstream of the filter 18. Concentrate is furthermore discharged from the condenser 13 via a concentrate line 10. The concentrate discharge line 10 branches off into a concentrate discharge line 22 which opens out into the waste water as well as into a recirculation line 23 for the concentrate. Via the recirculation line 23, the concentrate can be supplied via the feed water line 1 to the steam generator 3. Furthermore, a vacuum generator or respectively a device 5 for vacuum generation is provided. The device 5 fir vacuum generation is connected via vacuum connections 4 to the steam generator 3 and/or to the device 7 for membrane distillation and/or to the condenser 13. As described earlier, a suitable vacuum is generated in the corresponding chambers 28 for boiling point reduction. The components described are at least partially required for the so-called distillate operation.

During normal operation, drinking water enters as feed water into the device 7 for membrane distillation, with which a heating of the drinking water to a temperature above the boiling point that is reduced within the module can be achieved.

The device 5 for the maintenance of a pressure below the atmospheric pressure is connected to the entire arrangement; thus enabling the boiling point of the feed water to be reduced within the system by means of the pressure dependence of the boiling point.

Feed water 1 flows on the one side of the membrane 30. Vacuum is applied to the other side of the membrane 30. As a result, the boiling steam pressure of the heated feed water is undershot at the boundary surface: membrane-feed water, and a steam passage through the membrane 30 occurs. Due to the hydrophobic configuration of the membrane 30, said membrane allows only steam through and thus separates the steam phase from the liquid phase. The permeated steam can condense on condensation surfaces, such as, for example, films 32, which can be cooled, and be drawn off as sterile water via lines or respectively discharge lines 12 and then supplied to the collection tank 20. In order to cool water being used, said water can be supplied to the condensation unit via inlets and outlets 21 in the cooling circuit. Pure steam, which up until now is not condensed on films 32, can thereby be condensed almost completely to WFI in a last processing step.

Figure 2:
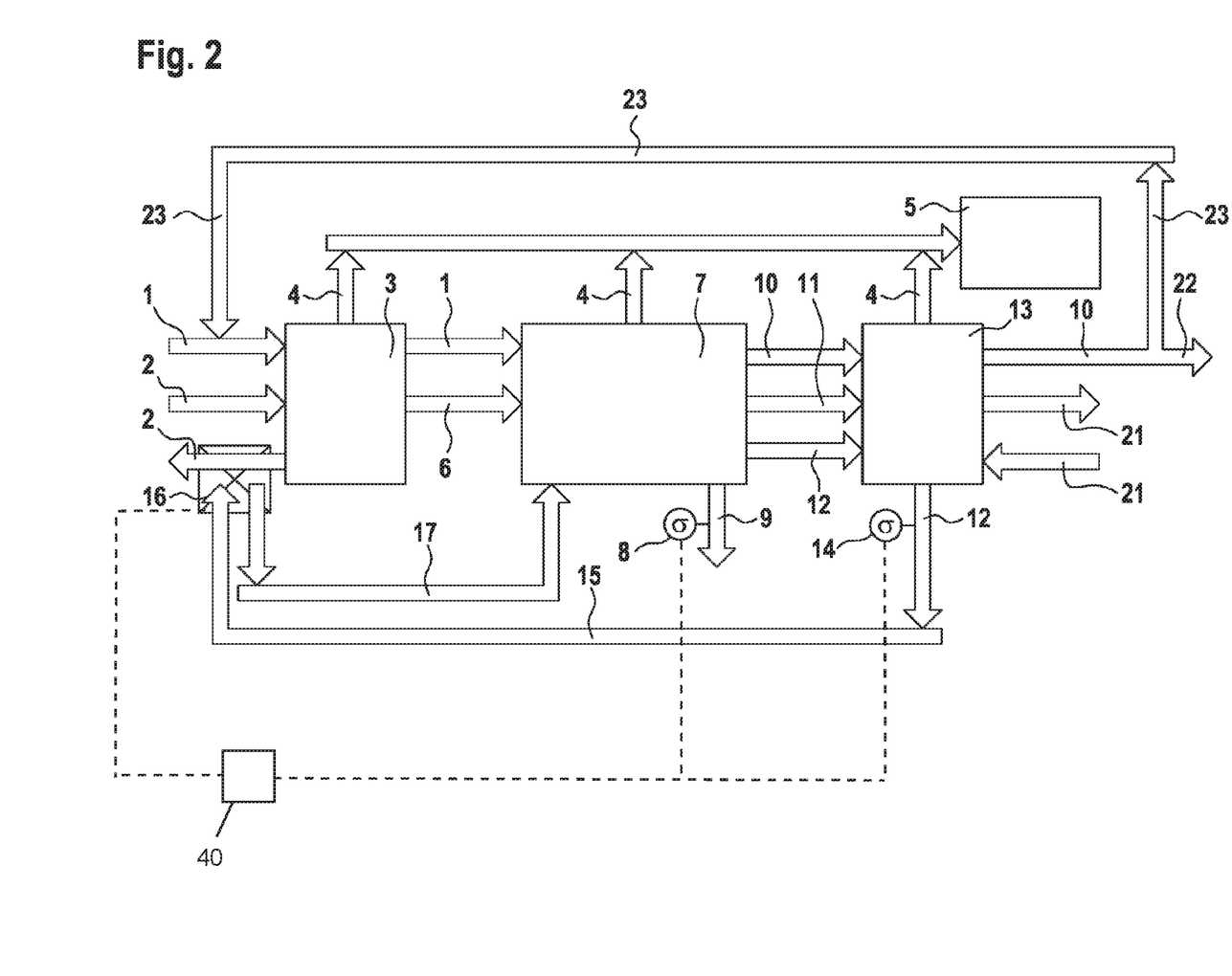
FIG. 2 shows a block diagram of an example of an arrangement according to the invention in operation so that a heating of the entire arrangement can be achieved in the interior of the chamber to a temperature of at least 85° C.

FIG. 2 shows the at least partially required components for the operating mode: hot water-sanitization. Distillate is supplied here to the heating element 16 via the line 15. The distillate heated by the heating element 16 is supplied to the device 7 for membrane distillation via a distillate return line 17. In this operating mode, the return of the distillate to the filter 18 or respectively the filling of the storage tank 20 with WFI stops.

FIG. 2 shows the operating mode, in which a temperature raised to at least 85° C. preferably for a time period of 60-90 min is maintained within the arrangement. It can be seen that the WFI collection tank 20 was separated and the entire product or distillate is heated via the heating element 16 to a temperature of at least 85° C. and can be fed via the return line 17 into the device 7 for membrane distillation. As a result, the hot water sanitization of the system is supported at at least 85° C.

Figure 3:
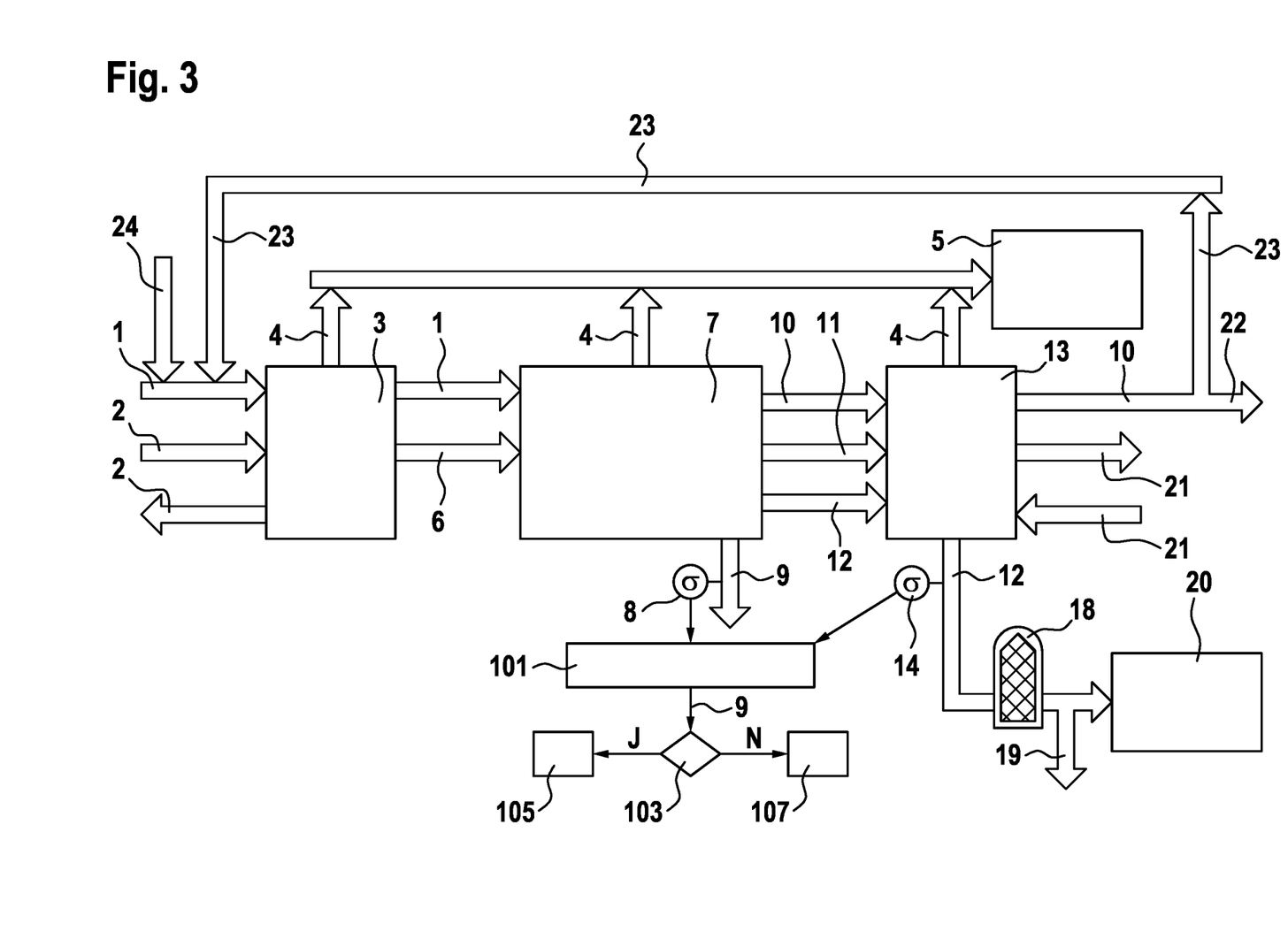
FIG. 3 shows a block diagram of an example of an arrangement according to the invention comprising a testing device.

FIG. 3 shows a block diagram with the option of checking the functionality of the integrity of the membranes 30. Testing units or respectively sensors 8, 14 are provided here, in which WFI can be fed and at least one measured variable can be monitored. This is preferably the electric conductivity or the specific electric resistance. A test solution of high electric conductivity or respectively low specific electric resistance is introduced into the feed water line 1 via an inlet 24, and the electric conductivity or respectively the specific electric resistance is monitored at the measuring positions by means of corresponding sensors 8, 14 in the drainage discharge line 9 and in the WFI- or distillate discharge line 12. A defect in a membrane 30 leads to the passage of non-evaporated feed water 1 into the drainage discharge line 9 and therefore here to a deflection at the measuring position 8. A defect in a film 32 leads to a passage of feed water into the WFI and therefore to a deflection at the measuring position 14.

Thus, the functionality of the membranes 30 and/or films 32 can be monitored if a predeterminable threshold value of the respective measured variable is exceeded or undershot. If such a state is detected, the connection to the collection tank 20 for sterile water is disconnected and the entire product is discarded into the waste water via the discard line 19. A purification of the system from biological and inorganic contaminations can be achieved by the introduction 24 of suitable bases and acids. In order to prevent inorganic deposits and to increase the service life of the system, the feed water can be subjected to different pretreatments.

FIG. 3 shows the operating mode of the integrity test of the membranes 30s with the at least partially required components. A test solution travels via a feed line 24 into the feed water line 1. The test solution relates, for example, to a cooking salt solution. The sensors or respectively the measuring probes 8, 14 detect, for example, the conductivity or the specific resistance of the drainage or respectively the distillate, step 101. A control detects whether a limit value has been exceeded, step 103. If the limit value has been exceeded, a membrane integrity does not exist, step 105. The membrane 30 is damaged. Otherwise the membrane integrity is fulfilled, step 107. In the operating mode of FIG. 3, the heating element 16 is no longer necessary. Thus, a recirculation of the distillate also stops. Instead, the distillate moves directly from the condenser 13 to the filter 18 and subsequently into the tank 20.

Figure 4:
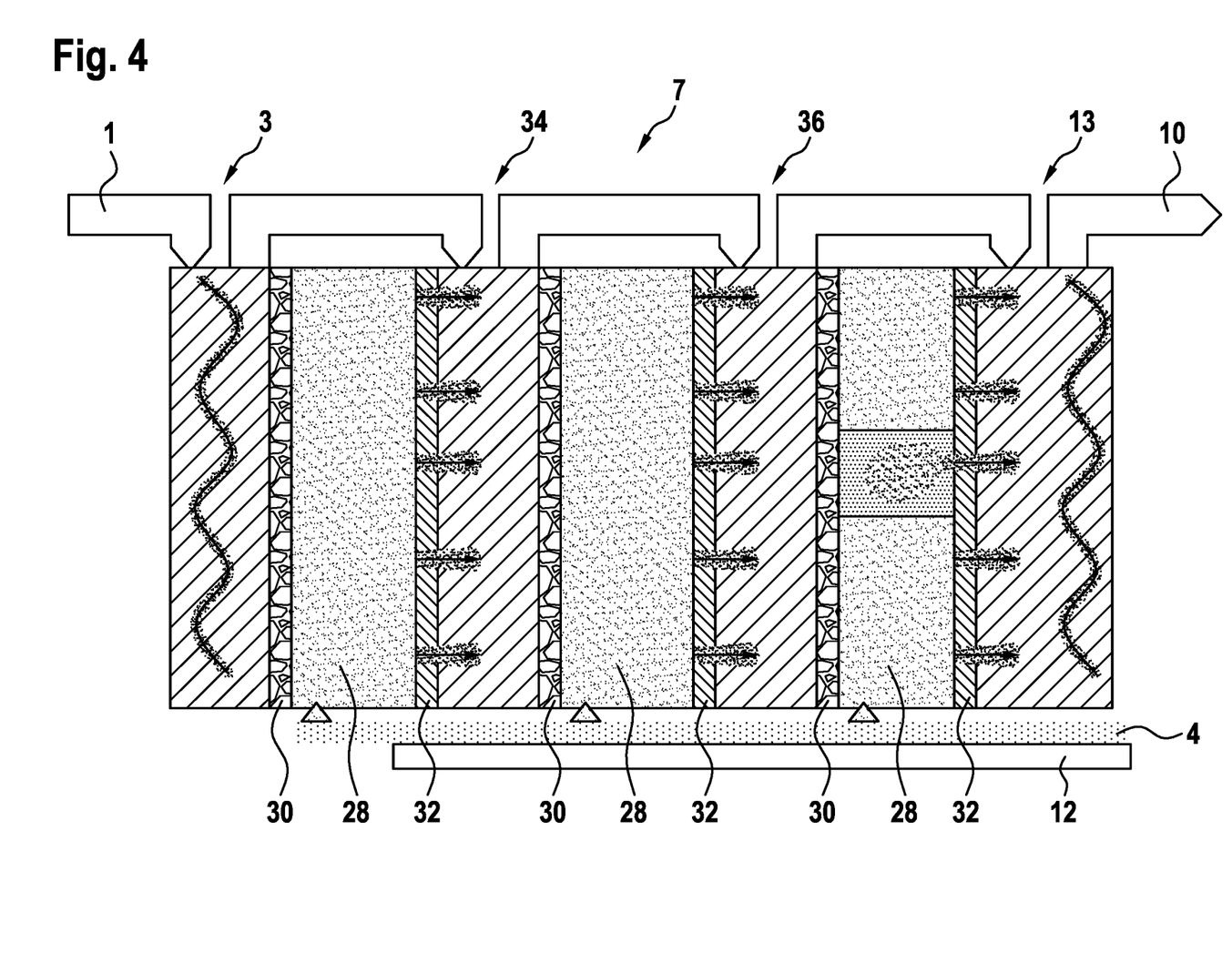
FIG. 4 shows a main block diagram of the membrane distillation.

FIG. 4 shows the principle of the underlying process of the membrane distillation known per se, for example from the EPO patent application EP 2427263 B 1. Feed water is heated in a steam generator 3 and moves via a membrane 30 to a first effect 34. The membrane 30 relates to a semipermeable, hydrophobic membrane 30. The first effect 34 consists of an alternating sequence of membrane frames (membranes 30) empty frames and film frames (condensation surface as, for example, films 32). Here the heating steam condenses out on the condensation surfaces, for example the films 32, and thus heats the feed water 1, which thereby evaporates to pure steam at the membranes 30. Said pure steam is guided to the next effect and condenses out on the films 32 to WFI and heats the feed; thus enabling a further portion to evaporate on the membranes 30. This process runs parallel in many frames and repeats itself up to the last effect 36. An alternating sequence of empty and film frames (films), which are cooled, is located in the condenser 13 in order to condense the residual pure steam.

The invention claimed is:

1. An arrangement for providing sterile water for injection purposes, the arrangement comprising:
    a chamber (28),
    a first device (5) for maintaining the chamber (28) at an inner pressure that is less than atmospheric pressure in order to reduce a boiling point of feed water, and
    a second device (2) for heating the feed water above the boiling point within the chamber (28),
    wherein the chamber (28) is equipped with at least one membrane (30), the at least one membrane (30) being impermeable for liquids, and a condensation surface (32) at a distance from the at least one membrane (30), wherein steam which is permeated through the at least one membrane (30) is condensed on the condensation surface (32),
    wherein the arrangement further comprises a first outlet (12) for removing from the chamber (28) the steam that has permeated through the at least one membrane (30) and condensed on the condensation surface (32) as sterile water for injection purposes,
    wherein a second outlet in the form of a drainage line (9) is connected to the chamber and is configured to remove from the chamber (28) the feed water that has permeated through the at least one membrane (30) and has condensed in the chamber (28) prior to reaching the condensation surface (32), and
    wherein the arrangement further comprises at least one sensor (8, 14) for detection of damage to the at least one membrane (30) and/or the condensation surface (32) by measuring an electric conductivity of the feed water in the drainage line (9).

2. The arrangement according to claim 1, further comprising at least one electronic controller (40) configured for heating the arrangement in an interior of the chamber (28) to a temperature of at least 85° C. before each start-up and/or at predeterminable time intervals.

3. The arrangement according to claim 1, further comprising a second sensor configured to monitor a temperature, at least one of the first outlet (12) and the second outlet (9) for sterile water and/or drainage and/or concentrate and/or in a condenser (13) and/or in a cooling circuit (21) and/or in a collection line for sterile water and/or in a heating circuit.

4. The arrangement according to claim 2, wherein the at least one sensor (8, 14) is configured to detect whether a predeterminable threshold value is undershot or exceeded, wherein, when the at least one sensor detects that the predeterminable threshold value is undershot or exceeded, an acoustic and/or optical signal can be generated and/or a warning signal is supplied to the at least one electronic controller (40) in order to indicate a defect.

5. The arrangement according to claim 1, further comprising a pump, wherein sterile water for injection purposes contained in the first outlet (12), a collection line or an internal collection tank, in which a pressure is maintained below the atmospheric pressure, is conveyed by the pump through a filter element (18) into a further external collection tank (20) for sterile water for injection purposes, in which atmospheric pressure is maintained.

6. The arrangement according to claim 1, further comprising
    a line (15), wherein sterile water for injection purposes contained in a discharge line (12), and
    a collection line or an internal collection tank for sterile water, wherein, in the collection line or the internal collection tank, a pressure is maintained below the atmospheric pressure, and wherein sterile water is supplied via the line (15) to a heating element (16) or respectively to a heating circuit (2) for the purpose of being heated.

7. The arrangement according to claim 1, characterized in that at least one return line (17) is connected to at least one discharge line (12) for sterile water, wherein water for injection purposes is returned via the at least one return line to the chamber (28) for membrane distillation during periods of time within which a temperature raised to at least 85° C. is maintained in the chamber (28).

8. The arrangement according to claim 5, characterized in that the filter element (18) is configured to provide an additional sterilization and/or disinfection.

9. The arrangement according to claim 1, further comprising a metering device for feeding a test solution of high electric conductivity in a supply line (1), preferably a feed water supply line.

10. The arrangement according to claim 1, further comprising means for supplying sterile water for injection purposes to the at least one sensor (14), whereby at least one measured variable can be tested to monitor a functionality of the at least one membrane (30) and/or when a threshold value of the at least one measured variable has been exceeded or undershot, the sterile water for injection purposes can be discharged via a discard line (19).

11. The arrangement according to claim 1, further comprising a recirculation line (23) connected to a discharge line (10) of a concentrate, wherein the recirculation line is configured to return at least portions of the concentrate, in particular for achieving a high recovery ratio, into a feed line (1) for the feed water.

12. The arrangement according to claim 1, further comprising means for pretreating the feed water, which can be supplied via a feed line (1).

13. The arrangement according to claim 1, further comprising outlets for ease of discharge of residues of the arrangement at a steam generator (3) and/or at a condenser (13).

14. The arrangement according to claim 1, wherein the condensation surface is a film (32) or a plate, and wherein the steam which is permeated through the at least one membrane (30) is condensed on the film (32) or the plate.

15. The arrangement according to claim 1, further comprising a metering device for feeding a test solution of high electric conductivity in a feed water supply line.

16. The arrangement according to claim 1, further comprising means for supplying sterile water for injection purposes to the at least one sensor (14), whereby an electric conductivity or a specific electric resistance can be tested to monitor functionality of the at least one membrane (30) and/or when a threshold value of the electric conductivity or the specific electric resistance has been exceeded or undershot, the sterile water for injection purposes can be discharged via a discard line (19).

17. The arrangement according to claim 1, further comprising a recirculation line (23) connected to a discharge line (10) of a concentrate, wherein the recirculation line is configured to return at least portions of the concentrate, for achieving a high recovery ratio, into a feed line (1) for the feed water.

18. The arrangement according to claim 4, wherein the predeterminable threshold value is an upper limit of the electric conductivity of the feed water in the drainage line (9).

* * * * *